(12) United States Patent
Ippers et al.

(10) Patent No.: US 9,382,026 B2
(45) Date of Patent: Jul. 5, 2016

(54) APPARATUS FOR CUTTING A PACKAGING MATERIAL FOR A PACKAGE

(75) Inventors: Juergen Ippers, Grefrath (DE); Ulrich Wieduwilt, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 316 days.

(21) Appl. No.: 13/882,400

(22) PCT Filed: Sep. 16, 2011

(86) PCT No.: PCT/EP2011/066121
§ 371 (c)(1),
(2), (4) Date: Apr. 29, 2013

(87) PCT Pub. No.: WO2012/055633
PCT Pub. Date: May 3, 2012

(65) Prior Publication Data
US 2013/0228288 A1    Sep. 5, 2013

(30) Foreign Application Priority Data
Oct. 29, 2010    (DE) .......................... 10 2010 043 090

(51) Int. Cl.
*B65B 61/10* (2006.01)
*B26D 1/12* (2006.01)
(Continued)

(52) U.S. Cl.
CPC .............. *B65B 61/06* (2013.01); *B26D 1/0006* (2013.01); *B26D 1/405* (2013.01); *B29C 65/087* (2013.01);
(Continued)

(58) Field of Classification Search
CPC ................... Y10T 156/1054; Y10T 156/1056; Y10T 156/12; Y10T 156/17; Y10T 156/1702; Y10T 156/1712; Y10S 53/02; Y10S 83/946; Y10S 83/952; Y10S 493/00; Y10S 493/916; Y10S 206/82; Y10S 206/824; B29C 65/7443; B29C 65/741; B29C 65/743; B29C 65/7439; B29C 65/7441; B29C 66/432; B26F 1/3826; B26F 1/384; B26F 2001/4427; B26F 2001/4472; B26F 2001/441; B26F 2210/14; B29L 2023/001; B26D 2001/0046; B26D 2001/0053; B26D 2001/006; B26D 1/015; B26D 1/125; B65B 61/08
See application file for complete search history.

(56) References Cited

U.S. PATENT DOCUMENTS 4,517,790 A * 5/1985 Kreager .......................... 53/552
4,609,107 A   9/1986 Martin et al.
(Continued)

FOREIGN PATENT DOCUMENTS

CN    1578717       2/2005
DE    102009000240  7/2010
(Continued)

OTHER PUBLICATIONS

International Search Report for Application No. PCT/EP2011/066121 dated Jan. 25, 2012 (English Translation and Original, 6 pages).

*Primary Examiner* — Linda L Gray
(74) *Attorney, Agent, or Firm* — Michael Best & Friedrich LLP

(57) ABSTRACT

The invention relates to an apparatus for cutting a packaging material (4) for a package, comprising an ultrasonic welding device (2) that includes a sonotrode (3) and an anvil (5) for sealing the packaging material (4), the sonotrode (3) being rotatable about a first axis of rotation (X) and the anvil (5) being rotatable about a second axis of rotation (Y). The apparatus further comprises a cutting device (6) which includes at least one knife (7) for cutting the packaging material (4) and which is arranged within the anvil (5). The invention is characterized in that the knife (7) has a blade (8) with a cutting edge (28) that includes at least two tips (33, 35) and at least two curved sections (22) interconnecting the two tips (33, 35).

19 Claims, 4 Drawing Sheets

(51) Int. Cl.
  *B29C 65/08* (2006.01)
  *B65B 61/06* (2006.01)
  *B26D 1/00* (2006.01)
  *B26D 1/40* (2006.01)
  *B29C 65/74* (2006.01)
  *B65B 51/22* (2006.01)
  *B65B 51/30* (2006.01)
  *B29C 65/00* (2006.01)
  *B26F 1/38* (2006.01)

(52) U.S. Cl.
  CPC ......... *B29C 65/7437* (2013.01); *B29C 65/7443* (2013.01); *B29C 66/1122* (2013.01); *B29C 66/4312* (2013.01); *B29C 66/81427* (2013.01); *B29C 66/81431* (2013.01); *B29C 66/81433* (2013.01); *B29C 66/83513* (2013.01); *B65B 51/225* (2013.01); *B65B 51/306* (2013.01); *B26D 1/125* (2013.01); *B26D 2001/006* (2013.01); *B26D 2001/0046* (2013.01); *B26F 1/384* (2013.01); *B29C 66/0062* (2013.01); *B29C 66/432* (2013.01); *B29C 66/81417* (2013.01); *B29C 66/849* (2013.01); *Y10S 53/02* (2013.01); *Y10S 83/946* (2013.01); *Y10T 156/12* (2015.01)

(56) References Cited

U.S. PATENT DOCUMENTS

| | | |
|---|---|---|
| 2007/0062158 A1 | 3/2007 | Boldrini et al. |
| 2009/0313944 A1 | 12/2009 | Ghiotti et al. |
| 2012/0012258 A1 | 1/2012 | Vogler |
| 2012/0178604 A1 | 7/2012 | Ippers et al. |
| 2014/0190125 A1* | 7/2014 | Rearick et al. .................. 53/434 |

FOREIGN PATENT DOCUMENTS

| | | |
|---|---|---|
| DE | 102009002093 | 10/2010 |
| EP | 2361834 | 8/2011 |
| WO | 2008/102250 | 8/2008 |

* cited by examiner

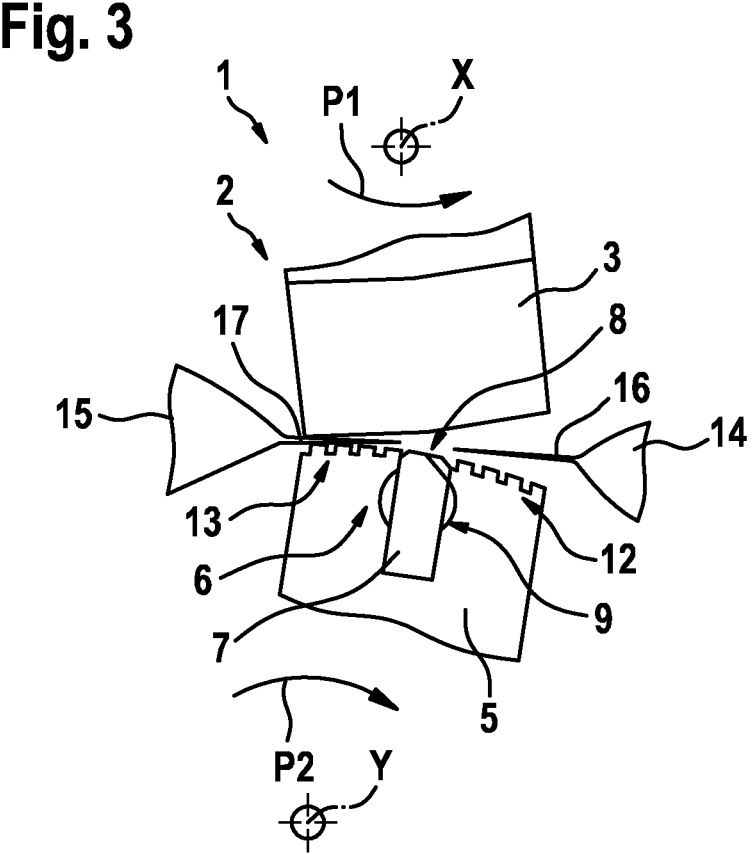
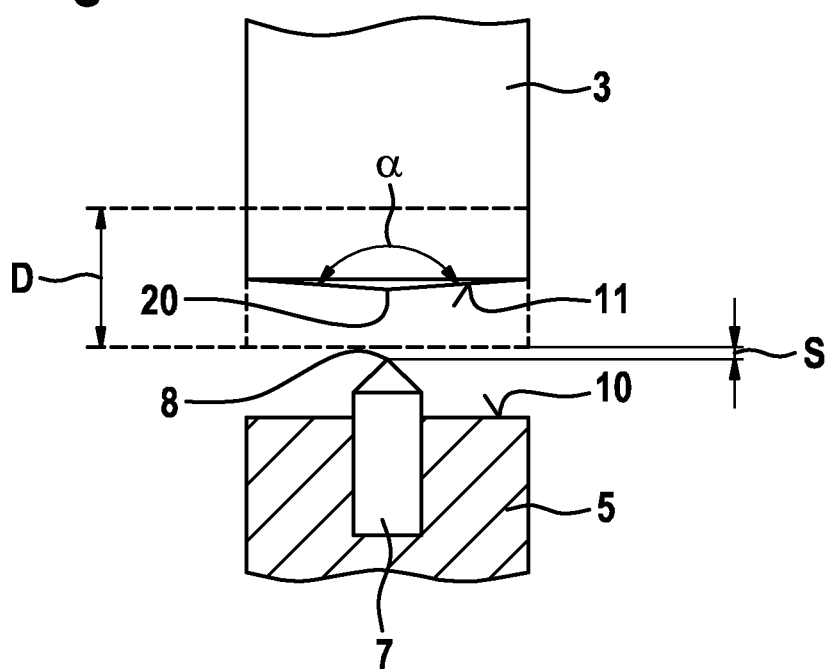

APPARATUS FOR CUTTING A PACKAGING MATERIAL FOR A PACKAGE

BACKGROUND OF THE INVENTION

The present invention relates to an apparatus for cutting a packaging material for a package, which is particularly used in tubular bag machines.

Tubular bag machines, which package sweets and other articles, are known from the prior art. A tube closed in an elongated manner is typically manufactured here by a film being pulled over a forming shoulder. In so doing, the one open end of the tube is sealed by means of a transverse sealing seam, which is produced by an ultrasonic welding device comprising a sonotrode and an anvil. The packaging material is welded between the sonotrode and the anvil by contacting both parts. After the filling process, the tube is closed above the filling area by means of a further transverse sealing seam to form a tubular bag. In addition, cutting apparatuses comprising a knife are usually provided in order to separate the bags which are still connected. Due to the knife having contact with the sonotrode, wear results and therefore the knife has to be replaced after a certain useful life. The WIPO patent application WO 2008/102250 discloses the use of special carbide inserts in the ultrasonic tools in order to reduce the wear as a result of the contact.

SUMMARY OF THE INVENTION

The apparatus according to the invention has in contrast the advantage that said apparatus facilitates the cutting of a packaging material for a package using reduced cutting force and cutting length while employing an integrated tear-open aid. The knife has a blade with a cutting edge that includes at least two tips and at least two curved sections interconnecting the two tips. The geometry described distinguishes itself from a conventional cutting line by reducing the cutting length. As a consequence, the required cutting force is also reduced. The cutting force is therefore smaller than the sealing force. The contour of the cutting edge is characterized particularly by the curved sections. The front tip and respectively upper tip pass over in each case into the straight sections via said curved sections. Front tip and upper tip are connected by the bracket-shaped section. The cutting length can thereby be reduced.

On the other hand, the notch effect of the cutting edge is selectively influenced by means of the geometry of the teeth. The tips serve namely as a tear-open aid by said tip perforating the packaging material. The tear-open aid can in principle be lengthened by reducing the acute angle. In so doing, the notch effect is increased without significantly increasing the cutting force at the same time. In a particularly preferred manner, the tip runs out at an acute angle in a range between 10° and 60°, preferably at approximately 30°, so that gut notch effects are achieved.

Provision is made in an expedient modification to the invention for the straight section to be formed by at least two surfaces converging at an angle of approximately 90°. The blade can thus be particularly easily manufactured on account of the rectangular basic form which can thereby be achieved.

Provision is made in an expedient modification to the invention for at least two surfaces to be disposed in the same plane in a preferential manner and to be connected to one another via a raised portion or a recess. Said raised portions or recesses form tips on the ends thereof in a particularly simple manner, which serve as a tear-open aid.

Provision is made in an expedient modification to the invention for the at least one knife to be disposed at the anvil such that a minimum spacing is maintained between the sonotrode and a blade of the knife; thus enabling the packaging material to be severed without said sonotrode and said knife coming into contact with each other. For that reason, additional components, as, e.g., the carbide inserts in apparatuses of the prior art, for protection from wear due to contact of the ultrasonic tools can be eliminated. In addition, the apparatus according to the invention has a long service life.

According to a preferred embodiment of the invention, the apparatus additionally comprises an adjusting device, which adjusts the position of the knife in the anvil in the radial direction of said anvil. The knife position can thereby be adapted in a simple manner to the oscillation amplitude of the sonotrode in accordance with the packaging material to be separated. Changeover times of the apparatus are thereby substantially reduced, which contributes to an increase in cost efficiency during production.

The knife protrudes preferably only slightly, in particular about 5 μm to 50 μm, preferably 10 μm to 20 μm, from a surface of the anvil facing the sonotrode. In so doing, the knife can guide the packaging material up to the sonotrode by this amount, the high frequency oscillations of which sever the packaging material at the blade of the knife without a contact pressing force between sonotrode and anvil.

According to a further preferred embodiment of the invention, a surface of the sonotrode facing the anvil is formed planarly and without recesses. This simple design substantially contributes to an improved sealing seam quality and to advantageous manufacturing costs of the sonotrode elements.

According to a further preferred embodiment of the invention, the sonotrode is designed in a roof-shaped manner at a flat angle. The rotational movements of the apparatus during welding and cutting of the packaging material can thereby be reduced to a small angular dimension and the entire manufacturing process can be accelerated.

The knife is preferably fixedly mounted in the cutting apparatus. In so doing, an elastic element between the knife and the anvil for decoupling vibrations between sonotrode and anvil can be eliminated. This contributes to a further simplification of the apparatus and a cost reduction in manufacturing the same. In addition, the replacement and the adjustment of the knife are thereby simplified.

It is furthermore preferred for the cutting apparatus to be disposed between a first sealing region and a second sealing region of the anvil. In so doing, a particularly compact design of the apparatus is achieved.

The invention further relates to a method for welding and cutting a packaging material. In this case, a reliable sealing and a contactless and wear-free cutting of the packaging material is thereby achieved in that in a first procedural step, the packaging material is positioned between a sonotrode and an anvil of an ultrasonic welding device and a base seam of a preceding package is sealed. The packaging material is subsequently severed between the preceding package and a succeeding package, wherein a rotation in a feed direction of the packaging material is executed in each case by the sonotrode about a first axis of rotation as well as by the anvil about a second axis of rotation. In so doing, a knife of a cutting device protruding from a surface of the anvil facing the the sonotrode makes contact with the packaging material and directs the same in the direction of the sonotrode. Said sonotrode sets the packaging material into oscillation; thus enabling said packaging material to be severed by the knife. During the process, a minimum spacing is maintained between the knife and the sonotrode in each position of said sonotrode and the anvil so that no contact results between said sonotrode and the knife. In a subsequent procedural step, a top seam of the succeeding package is sealed.

It is furthermore preferred for a cutting force of the cutting device to be smaller than a sealing force of the ultrasonic welding device. This contributes to an improved sealing quality of the top and base seams of the packages. In addition, the knife can be adjusted in a preferential manner; and therefore the size of the minimum spacing can be adapted and adjusted to the oscillation amplitude of the sonotrode and in accordance with the material thickness and material properties of the packaging material.

Further expedient modifications ensue from further dependent claims and from the description.

BRIEF DESCRIPTION OF THE DRAWINGS

An exemplary embodiment of the invention is described below in detail with reference to the accompanying drawings. In the drawings:

FIG. 3 shows a schematic cross-sectional view of the apparatus from FIG. 1 in a third position, FIG. 4 shows an enlarged schematic cross-sectional view of the sealing tools of the apparatus from FIG. 1.

DETAILED DESCRIPTION

Figure 1:
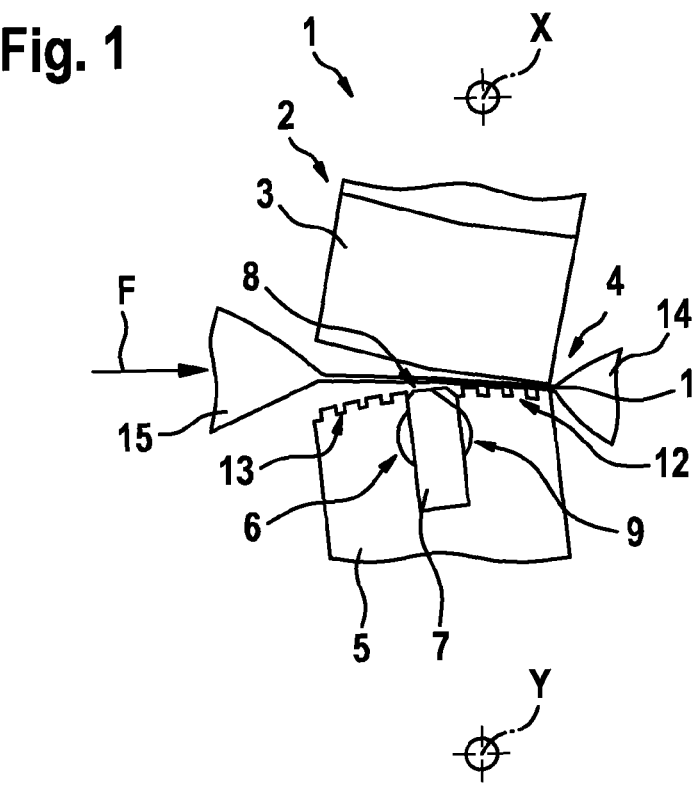
FIG. 1 shows a schematic cross-sectional view of the apparatus according to the invention in a first position.

As can be seen in FIG. 1, the apparatus 1 for welding and cutting a packaging material 4 comprises an ultrasonic welding device 2 having a sonotrode 3 and an anvil 5, between which the packaging material 4, which constitutes a preceding package 14 and a succeeding package 15, is passed in a conveying direction F denoted with an arrow. The sonotrode can be rotated about a first axis of rotation X and the anvil 5 about a second axis of rotation Y.

A cutting device 6 including a knife 7 and an adjusting device 9, by means of which the knife 7 is fixed as well as adjusted in the radial direction of the anvil 5, is arranged in the interior of the anvil 5. The cutting device 6 is disposed between a first sealing region 12 and a second sealing region 13 of the anvil 5.

As can be seen in the enlarged schematic cross-sectional view of FIG. 4, the knife 7 protrudes from a surface 10 of the anvil 5 that faces the sonotrode 3. A minimum spacing S between a blade 8 of the knife 7 and a roof point 20 of the sonotrode 3 is thereby maintained at a maximum extent of travel of said sonotrode oscillating with an amplitude D. Said maximum extent of travel of said sonotrode is symbolically depicted with a dashed line. This minimum spacing S lies preferably in a range from 5 µm to 50 µm. As can further be seen in FIG. 4, a surface 11 of said sonotrode directed towards the anvil 5 is designed without recesses and in a roof-like manner at an angle α having a low incline. Said angle α is preferably within a range of 165° to 175° and is depicted in FIG. 4 by way of example at an incline, where α=172°.

Figure 2:
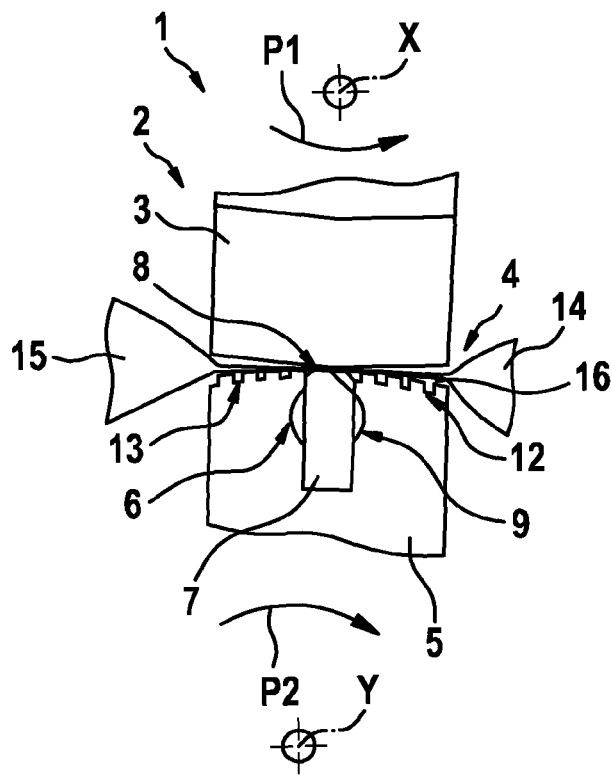
FIG. 2 shows a schematic cross-sectional view of the apparatus from FIG. 1 in a second position.

The welding and cutting of the packaging material 4 of a package takes place in three steps or positions, which are depicted in FIGS. 1 to 3. In the first position of the ultrasonic welding device 2 depicted in FIG. 1, a base seam 16 of the preceding package 14 is initially sealed at the first sealing region 12, said package being fixed between the sonotrode 3 and the anvil 5.

In the second position of the ultrasonic welding device 2 depicted in FIG. 2, the packaging material 4 is severed between the preceding package 14 and the succeeding package 15. To that end and pursuant to the example depicted in FIG. 4, the sonotrode 3 executes a revolution about the axis of rotation thereof X in the direction of arrow P1 and the anvil 5 a revolution about the axis of rotation thereof Y in the direction of arrow P2 of 8° in each case. In so doing, the roof point (20) (see FIG. 4) of the surface 11 of the sonotrode 3 and the blade 8 are situated opposite one another in the radial direction. As a result rotation of the anvil 5, the packaging material, which for the sake of better clarity is not depicted in FIG. 4, is lifted or respectively guided by the knife 7 in the direction of the sonotrode 3 and rests on the blade 8. As a result of the oscillations of the sonotrode 3, the packaging material is severed between the roof point 20 and the blade 8 of the knife, wherein the minimum spacing S is adjusted smaller or maximally the same size as a material thickness of the packaging material so that no mechanical contact results between the sonotrode 3 and the knife 7.

In the third position of the ultrasonic welding device 2 depicted in FIG. 3, a top seam 17 of a succeeding package 15 is sealed at the second sealing region 13. To meet this end, the sonotrode 3 and the anvil 5 in each case execute a further revolution of 8° about the axis of rotation thereof X or Y in the direction of the arrow P1 or P2 and seal the top seam 17 of the succeeding package 15 between the sonotrode 3 and the anvil 5.

Figure 5:
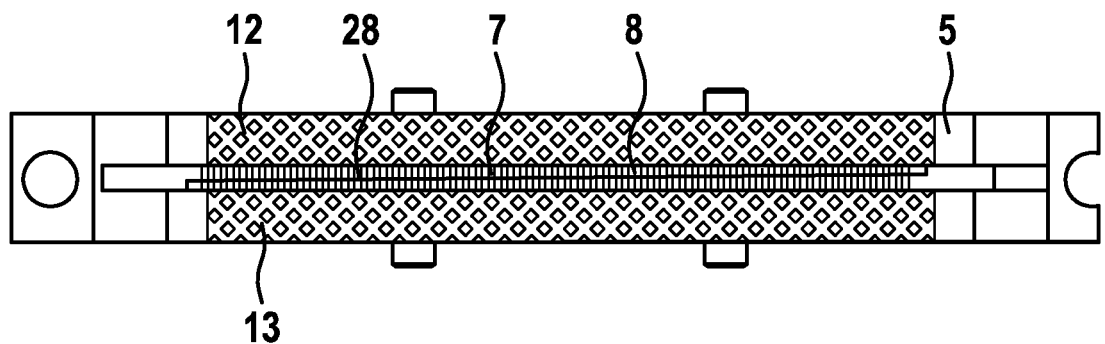
FIG. 5 shows a top view of the surface area of the anvil.

Pursuant to FIG. 5, the blade 8 of the knife 7 lies between the first sealing region 12 and the second sealing region 13. The blade 8 is disposed such that a cutting edge 28 protrudes the furthest. It can be seen in FIG. 5 that the cutting edge 28 runs substantially diagonally from the left upper side of the second sealing surface 13 up to the right lower corner of the first sealing surface 12. The cutting time is thereby lengthened and the cutting force is reduced.

Figure 6:
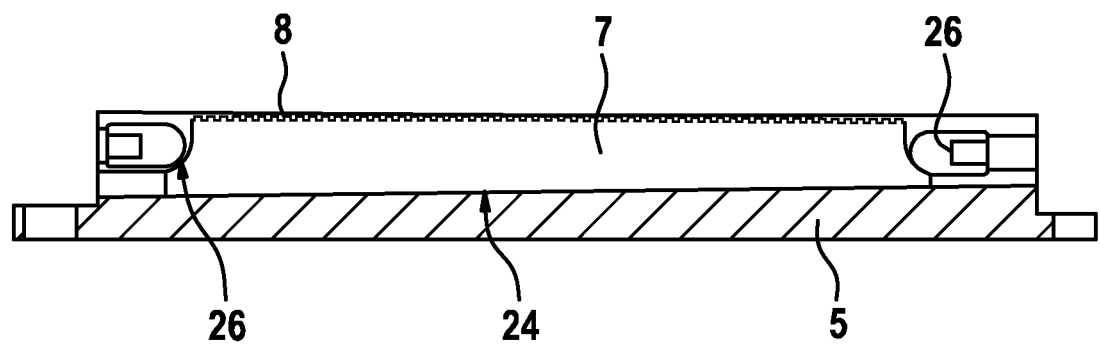
FIG. 6 shows a side view of the anvil from FIG. 5.

It can be seen in the associated cross-sectional view according to FIG. 6 that the knife has a wedge-shaped bevel 24 which interacts with a corresponding surface of the anvil 5. The extent to which the blade 8 protrudes can be adjusted by displacing said blade along the bevel 24 using the adjusting means 26 disposed on the right and left side thereof.

Figure 7:
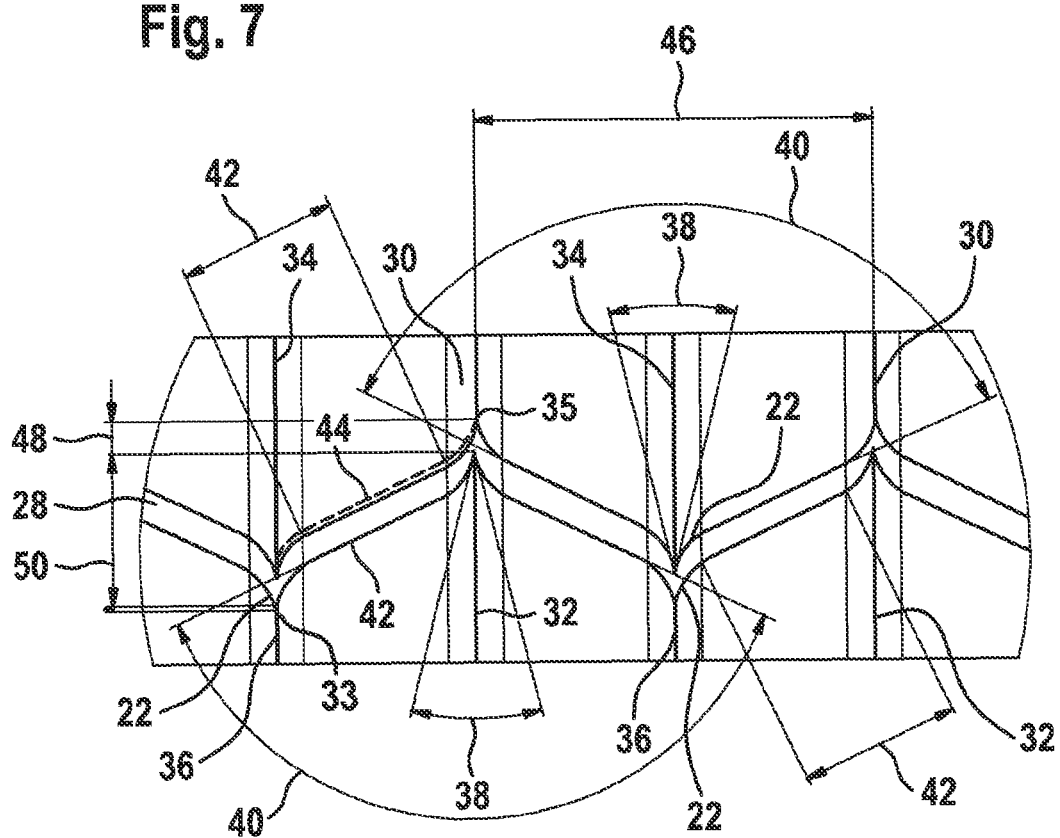
FIG. 7 shows a top view of an enlarged section of the knife according to FIG. 6
Figure 8:
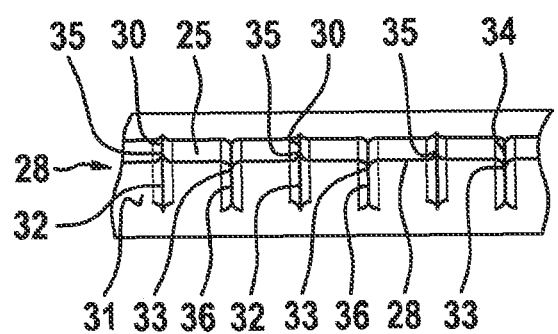
FIG. 8 shows a perspective view of a section of the knife.

The cutting edge 28 shown in FIGS. 7 and 8 is formed in the following manner. The knife 7 has a substantially rectangular structure having front surfaces 31 and upper surfaces 25, which respectively lie in a plane. The front surfaces 31 are alternately separated by front recesses 32 and front raised portions 36. The front recesses 32 and front raised portions 36 run in each case linearly from top to bottom. The upper surfaces 25 are alternately separated by upper raised portions 30 and upper recesses 34. Upper raised portions 30 and upper recesses 34 run in each case linearly from front to back. An upper raised portion 30 and a front recess 32 run in each case along a line across the front side and the upper side of the knife 7. Front raised portion 36 and upper recess 34 run in each case along a line across front side and upper side of the knife 7. Front and upper raised portion 36, 30 as well as front and upper recess 32, 34 begin in each case at an obtuse angle 38 and reach an upper tip 35 or a front tip 33 at an acute angle 40. The transition between the region with the obtuse angle 40 and the region with the acute angle 38 occurs with a curved section or respectively with a radius 22. A straight section 42 is situated between the curved sections 22. A bracket-shaped section 44 consisting of a straight section 42 and two curved sections 22 lies between a forwardly protruding tip up to an upwardly protruding tip. Two adjacent upper raised portions 30 are spaced apart from one another by a distance 46. A transition length 48 with respect to the alignment of the upper raised portion 30 is calculated from the end point of the straight section 42 up until the upper raised section 30 has achieved the maximum height and forms the upper tip 35. A spacing 50 is determined by the distance between the front raised portion 36 (after leaving the curved section 22 in the region of the front tip 33) and the upper raised portion 30 (after leaving the curved section 22 in the region of the upper tip 35) being calculated.

The acute angle 38 preferably lies in a range from 10° to 60°, particularly preferred at 30°. The obtuse angle 40 preferably lies within a range from 60° to 150°, particularly preferred at 130°. The distance 46 preferably lies within a range from 2 to 6 mm, particularly preferred at 3.75 mm. The straight section 42 preferably lies within a range of 0.5 to 3 mm, particularly preferred at 1 mm. The curved section 22 preferably lies within a range from 0.01 to 1 mm, particularly preferred at 0.5 mm.

The geometry described is set apart from a conventional zig-zag line by a reduction in the cutting length in the order of 20%. As a result, the cutting force needed is also reduced. In so doing, the cutting force is less than the sealing force. The contour of the cutting edge 28 is characterized particularly by the curved sections 22. Front tip 33 or upper tip transitions in each case into the straight sections 42 via said curved sections 22. Front tip 33 and upper tip 35 are connected by means of the bracket-shaped section.

In contrast to conventional cutting profiles, a reduction in the cutting force can be achieved at constant pressure due to the extension of the cutting edge 28. This results particularly on account of the use of curved sections 22 or line arcs merging into one another. On the other hand, the notch effect of the cutting edge 28 is selectively influenced by means of the geometry of the tips 33, 35. The tips 33, 35 serve namely as a tear-open aid by said tips perforating the packaging material 4. The tear-open aid can in principle be lengthened by reducing the acute angle 38. In so doing, the notch effect is increased without the cutting force thereby being significantly increased.

The knife 7 is fastened in the anvil 5 in such a way that the blade 8 as the highest line of the surface of the anvil 5 projects above in the direction of the sonotrode 3.

The inventive apparatus can be used with or retrofitted to conventional, rotary tubular bag machines and facilitates the contactless and wear-free cutting of the packaging material with minimum cutting forces, which are less than the sealing forces for producing the top and base seams. Due to the minimum rotational movements of the ultrasonic sealing tools, very short working processes and a corresponding higher production throughput can be achieved.

The invention claimed is:

1. An apparatus for cutting a packaging material (4) for a package, comprising:
    an ultrasonic welding device (2) that includes a sonotrode (3) and an anvil (5) for sealing the packaging material (4), the sonotrode (3) being rotatable about a first axis of rotation (X) and the anvil (5) being rotatable about a second axis of rotation (Y), and
    a cutting device (6) which includes at least one knife (7) for cutting the packaging material (4) and which is arranged within the anvil (5), characterized in that the knife (7) has a blade (8) with a cutting edge (28) that includes at least two tips (33, 35) and at least two curved sections (22) interconnecting the two tips (33, 35), wherein the cutting edge (28) comprises a straight section (42) which connects the at least two curved sections (22) to one another.

2. The apparatus according to claim 1, characterized in that the cutting edge (28) has a bracket-shaped section (44) which comprises the at least two curved sections (22).

3. The apparatus according to claim 1, characterized in that the straight section (42) is formed by at least two surfaces (29, 31) converging.

4. The apparatus according to claim 3, characterized in that the at least two surfaces (29; 31) are connected to one another via a raised portion (30; 36) or a recess (34; 32).

5. The apparatus according to claim 3, characterized in that the at least two surfaces (29; 31) are connected to one another via a raised portion (30; 36) or a recess (34; 32) and via curved sections (22).

6. The apparatus according to claim 1, characterized in that the tips (33, 35) alternately protrude once with respect to one surface (31) and subsequently with respect to other surfaces (31; 29).

7. The apparatus according to claim 1, characterized in that the tip (33, 35) is alternately oriented once in the normal direction of one surface (31) and subsequently in the normal direction with respect to an other surface (31; 29).

8. The apparatus according to claim 1, characterized in that the tip (33, 35) defines an acute angle (38) in a range between 10° and 60°.

9. The apparatus according to claim 1, characterized in that the at least one knife (7) is disposed at the anvil (5) such that a minimum spacing (S) is maintained between the sonotrode (3) and the blade (8) of the knife (7); thus enabling the packaging material (4) to be severed without contact between said sonotrode (3) and said knife (7).

10. The apparatus according to claim 1, characterized in that the straight section (42) is formed by at least two surfaces (29, 31) converging at an angle of approximately 90°.

11. The apparatus according to claim 10, characterized in that at least two surfaces (29; 31) are disposed in the same plane and are connected to one another via a raised portion (30; 36) or a recess (34; 32).

12. The apparatus according to claim 1, characterized in that the tip (33, 35) defines an acute angle (38) of approximately 30°.

13. The apparatus according to claim 2, characterized in that the straight section (42) is formed by at least two surfaces (29, 31) converging.

14. The apparatus according to claim 13, characterized in that the at least two surfaces (29; 31) are connected to one another via a raised portion (30; 36) or a recess (34; 32).

15. The apparatus according to claim 13, characterized in that the at least two surfaces (29; 31) are connected to one another via a raised portion (30; 36) or a recess (34; 32) and via curved sections (22).

16. The apparatus according to claim 2, characterized in that the straight section (42) is formed by at least two surfaces (29, 31) converging at an angle of approximately 90°.

17. The apparatus according to claim 16, characterized in that at least two surfaces (29; 31) are disposed in the same plane and are connected to one another via a raised portion (30; 36) or a recess (34; 32).

18. An apparatus for cutting a packaging material (4) for a package, comprising:
    an ultrasonic welding device (2) that includes a sonotrode (3) and an anvil (5) for sealing the packaging material (4), the sonotrode (3) being rotatable about a first axis of rotation (X) and the anvil (5) being rotatable about a second axis of rotation (Y), and a cutting device (6) which includes at least one knife (7) for cutting the packaging material (4) and which is arranged within the anvil (5), characterized in that the knife (7) has a blade (8) with a cutting edge (28) that includes at least two tips (33, 35) and at least two curved sections (22) interconnecting the two tips (33, 35), wherein the tip (33, 35) is alternately oriented once in the normal direction of one surface (31) and subsequently in the normal direction with respect to an other surface (31; 29).

19. An apparatus for cutting a packaging material (4) for a package, comprising:

an ultrasonic welding device (2) that includes a sonotrode (3) and an anvil (5) for sealing the packaging material (4), the sonotrode (3) being rotatable about a first axis of rotation (X) and the anvil (5) being rotatable about a second axis of rotation (Y), and a cutting device (6) which includes at least one knife (7) for cutting the packaging material (4) and which is arranged within the anvil (5), characterized in that the knife (7) has a blade (8) with a cutting edge (28) that includes at least two tips (33, 35) and at least two curved sections (22) interconnecting the two tips (33, 35), wherein the at least one knife (7) is disposed at the anvil (5) such that a minimum spacing (S) is maintained between the sonotrode (3) and the blade (8) of the knife (7); thus enabling the packaging material (4) to be severed without contact between said sonotrode (3) and said knife (7).

* * * * *